United States Patent [19]

Foust et al.

[11] Patent Number: 4,552,499

[45] Date of Patent: Nov. 12, 1985

[54] SLIP SHEET RETAINERS

[75] Inventors: Julian D. Foust; Leonard M. Ysidro, Sr., both of Cleveland; Danny R. Cross, Decatur, all of Tenn.

[73] Assignee: Olin Corporation, Cheshire, Conn.

[21] Appl. No.: 452,262

[22] Filed: Dec. 22, 1982

[51] Int. Cl.[4] .............................. B65G 57/00
[52] U.S. Cl. ........................ 414/125; 198/465.1; 414/42; 414/101
[58] Field of Search ............ 198/738, 746, 749, 836, 198/472, 486; 414/28, 29, 42, 43, 101, 125, 110

[56] References Cited

U.S. PATENT DOCUMENTS

| | | | |
|---|---|---|---|
| 2,467,203 | 4/1949 | Gelbman | 25/1 |
| 2,633,251 | 3/1953 | Bruce | 214/6 |
| 2,699,264 | 1/1955 | Bruce | 214/6 |
| 2,949,179 | 8/1960 | Busse | 198/30 |
| 3,404,788 | 10/1968 | Thomas et al. | 214/6 |
| 3,519,144 | 7/1970 | Calistrat | 414/43 X |
| 3,522,890 | 8/1970 | Birchall | 214/6 |
| 3,682,290 | 8/1972 | Von Gal, Jr. et al. | 198/21 |
| 3,682,338 | 8/1972 | Von Gal, Jr. et al. | 214/8.5 D |
| 3,693,321 | 9/1972 | Nilsson | 53/244 |
| 3,710,532 | 1/1973 | Smilek et al. | 53/26 |
| 3,767,342 | 10/1973 | Potter et al. | 425/157 |
| 3,888,344 | 6/1975 | Major | 198/746 X |
| 4,067,458 | 1/1978 | Schneider et al. | 214/8.5 D |
| 4,164,391 | 8/1979 | Howard et al. | 198/472 X |
| 4,170,292 | 10/1979 | Lang | 198/746 |
| 4,271,755 | 6/1981 | Kintgen et al. | 414/62 X |

Primary Examiner—Robert J. Spar
Assistant Examiner—Janice Krizek
Attorney, Agent, or Firm—Ralph D'Alessandro; Donald F. Clements; Thomas P. O'Day

[57] ABSTRACT

Apparatus is provided for retaining a slip sheet in place on top of a pallet as the pallet is conveyed along a predetermined path of travel in a palletizer, depalletizer or other conveying means.

10 Claims, 6 Drawing Figures

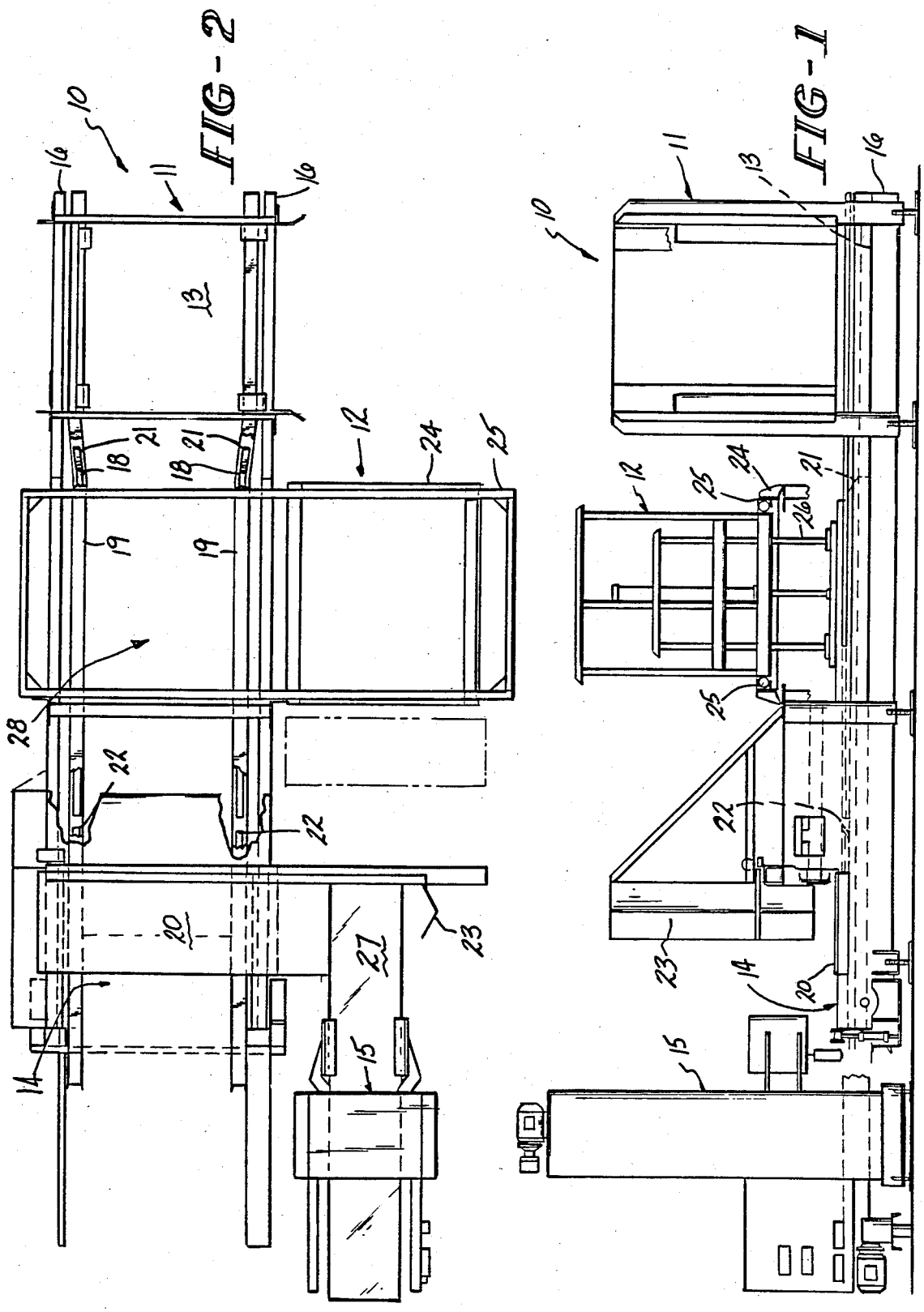

SLIP SHEET RETAINERS

BACKGROUND OF THE INVENTION

This invention relates generally to automatic palletizers or depalletizers and more specifically to apparatus that is employed to retain individual slip sheets on top of pallets as the pallets are fed to a loading or unloading position.

The use of pallets on which to stack products to be shipped has long been common practice in industry. The pallets are generally made from wood of varying height and have openings which permit forklifts to extend their forks through to lift an entire load. The product or objects to be shipped are stacked or appropriately placed on top of the pallet.

Automation in manufacturing production lines has led to the development of automatic palletizers. These machines feed pallets automatically from a stack of pallets in a pallet feed rack onto a conveyor which carries the pallets to the loading point. The dispensing of the pallets along the conveyor is a stepped and timed sequence to correspond to the availability of product or material being stacked upon the pallets. The loaded pallets are discharged from the palletizer and then removed, generally by a forklift, to a shipping location where the pallets and the product are loaded onto the appropriate means of transportation, such as a truck or railroad car.

Where pallets are used as an intermediate support for the product that is to be repackaged, shipped on slip sheets without pallets, or moved again prior to placement on the final shipping means, slip sheets or pieces of cardboard or other material of predetermined thickness are placed on top of the pallets. The slip sheets permit the product to be removed more easily from the top of the pallet without damaging either the product containers or the pallets. They also can provide the final shipping base for use with specially modified forklifts and unitized loads, such as in unitized loads where stretch wrapping, banding or gluing is employed. This unitized loading technique reduces shipping freight costs and the number of costly pallets required. However, in an automatic palletizer there has been no apparatus to hold a slip sheet in place on top of the pallet as the pallet moves along its predetermined path on the palletizer conveyor toward the loading point. This and other problems are solved in the design of the apparatus comprising the present invention by employing means to retain a slip sheet in position on top of a pallet.

SUMMARY OF THE INVENTION

It is an object of the present invention to provide means or apparatus to retain an individual slip sheet in position on top of a pallet as the pallet is moved along a predetermined path of travel by a conveyor in an automatic palletizer, depalletizer or other conveying means.

It is another object of the present invention to provide means for retaining a slip sheet on top of a pallet that is automatically actuated and deactuated or retracted at predetermined points along the predetermined path of travel and still is simple in design.

It is a feature of the present invention that the means for retaining the slip sheet in position on top of the pallet is pivotable between a first lowered position and a second raised position.

It is another feature of the present invention that means contactable with a pallet moves along opposing side tracks that at a first location along the predetermined path cause the means for retaining the slip sheet to move from a first lowered position to a second raised position and at a second location cause the means for retaining the slip sheet to move from the second raised position to the first lowered position.

It is still another feature of the present invention that the means for retaining the slip sheet is serrated or roughened on at least a first edge surface that engages the slip sheet to prevent the slip sheet from riding up and over the retaining means.

It is still another feature of the present invention that the means contactable with a pallet includes a roller on at least a portion of the top surface.

It is an advantage of the present invention that a slip sheet remains in position on top of the individual pallet after the movement of the pallet commences along the predetermined path of travel of the automatic palletizer.

It is another advantage of the present invention that the retaining dogs or means for retaining the slip sheet are automatically actuated or triggered between the second raised and the first lowered positions by means on the opposing side tracks at predetermined locations.

It is still another advantage of the present invention that the bottom of the next higher pallet is the pallet feed rack or magazine is temporarily supported by the roller on the means contactable with a pallet so that the drag of the stacked pallets above the pallet being removed from the pallet feed rack is reduced.

These and other objects, features and advantages are provided by the apparatus comprising the present invention wherein an automatic palletizer, depalletizer or other conveying means is provided with means for retaining a slip sheet in position on top of a pallet as the pallet is conveyed along a predetermined path of travel from a pallet feed rack to a pallet loading point such that at a first location along the predetermined path the retaining means move from a first lowered position to a second raised position and at a second location along the predetermined path the retaining means move from the second raised position to the first lowered position.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a side elevational view of an automatic palletizer showing a pallet feed rack, the slip sheet dispenser and the means used to raise the retaining dogs and lower the retaining dogs as the pallet is moved along the predetermined path of travel;

FIG. 2 is a top plan view of the automatic palletizer with portions broken away to show the inclined ramp portion and the downwardly sloped stop portion which raise the retaining dogs and lower the retaining dogs, respectively;

DETAILED DESCRIPTION OF THE PREFERRED EMBODIMENT

Figure 3:
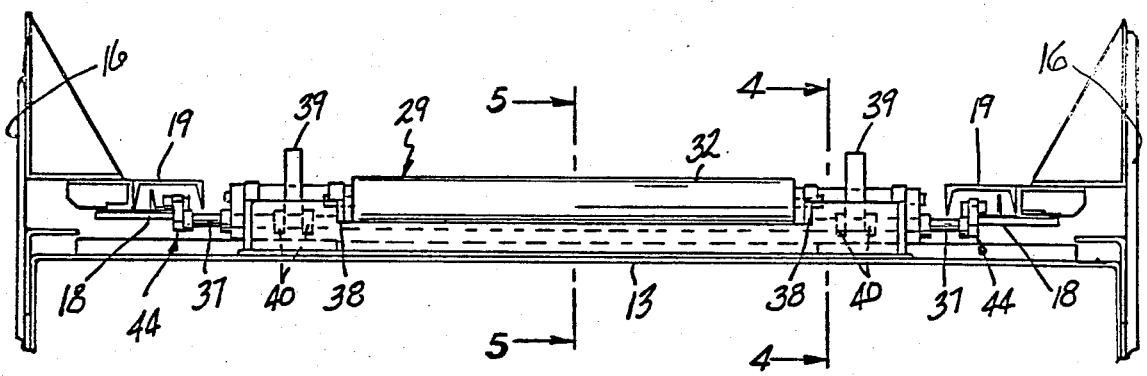
FIG. 3 is a front elevational view of the pallet push bar showing the retaining dogs in a raised position as the push bar moves down the opposing side tracks.

FIGS. 1 and 2 show an automatic palletizer, indicated generally by the numeral 10. An automatic palletizer 10 similar to the one disclosed is commercially available from Currie Manufacturing Company. The palletizer 10 includes a pallet feed stack or magazine 11 within which pallets are stored vertically. The pallet feed stack 11 is a bottom-feed device so that the bottommost pallet is deposited on a floor member 13, such as a steel sheet, along which the pallets are slid as they move along a predetermined path of travel that takes them the length of the palletizer 10.

Adjacent the pallet feed stack 11 is the slip sheet dispenser 12. Slip sheet dispenser 12 includes a slip sheet rack or magazine 24, best seen in FIG. 2, and a slip sheet track 25 along which the slip sheet dispensing mechanism 26 of FIG. 1 rides to carry a slip sheet from the slip sheet rack 24 to the slip sheet placement area 28 along the predetermined path of travel on the palletizer 10.

Once the slip sheet is placed upon the pallet in the slip sheet placement area 28, the pallet is moved foward to the pallet loading area 14 where the product to be loaded onto the pallet is positioned. A stacker, indicated generally by the numeral 15, can be used to create stacks of product containers, such as drums, a predetermined number high so they may be moved to the pallet loading area. A ram 23 pushes the stacked containers from the stacker conveyor 27, typically a chain driven roller conveyor, onto the stripper plate 20.

The stripper plate 20 provides a location on which is placed the drums or other containers in which the product is packaged prior to the containers being pushed in their stacks on top of the pallet. The stripper plate 20 is moveable vertically to adjust to the height of the pallet since the pallets are not uniform in their height and can vary, such as from 4½ inches to 5½, inches in height. This vertical adjustability permits the stripper plate 20 to be positioned at a sufficient height to let a pallet with a slip sheet on top pass under.

As best seen in FIGS. 1 and 2 the automatic palletizer has a frame 16 which supports the palletizer feed stack 11, chain conveyor (not shown), and the other components of the automatic palletizer 10. The frame 16 also supports the opposing tracks 18 along which the pallet push bar 29 of FIGS. 3 and 6 travels. The pallet push bar 29 is connected to a chain conveyor (not shown) that is part of the automatic palletizer 10 and which moves in a predetermined path of travel down the length of the palletizer frame 6. The conveyor is comprised of two opposing continuous lengths of chain to which is appropriately connected the pallet push bar 29.

Figures 4, 5:
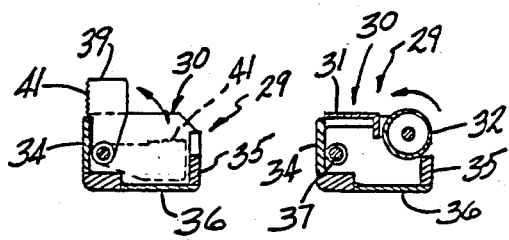
FIG. 4 is a sectional view taken along the lines of 4—4 FIG. 3 showing the retaining dogs in a raised position in solid lines and in a lowered position in phantom lines.
FIG. 5 is a sectional view taken along the lines 5—5 of FIG. 3 showing the rotatable roller across at least a portion of the top surface of the pallet push bar.

The pallet push bar 29 is shown in sectional views in FIGS. 4 and 5 and can be seen there to have a top portion 30 which includes a cover plate 31 and a rotatable roller 32. The remainder of the pallet push bar 29 has a generally rectangular shape with a front side 34, a rear side 35 and a base portion 36. Running through the pallet push bar 29 is a rotatable shaft 37. Adjacent, but exteriorly of the roller 32, as seen in FIGS. 3 and 6 are roller mounting plates 38 and a pair of slip sheet retaining means or dogs 39.

Figure 6:
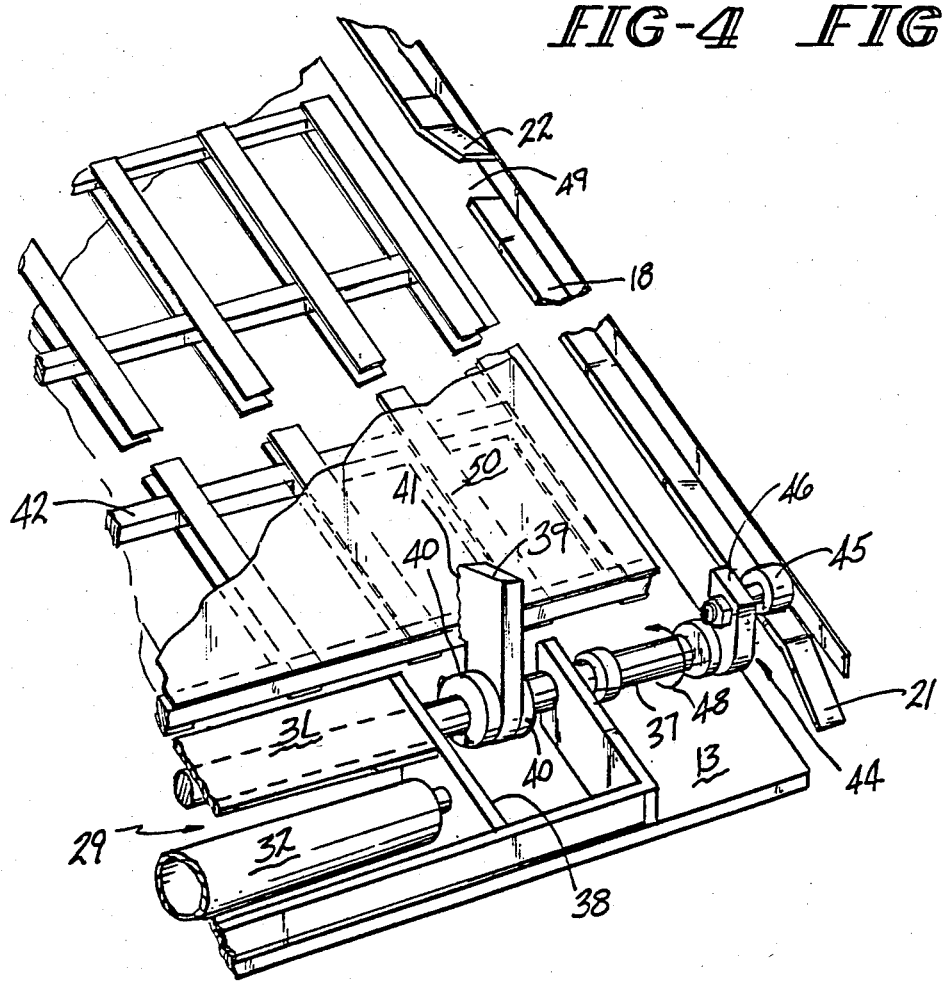
FIG. 6 is an enlarged, partial perspective view showing one of the opposing side tracks with the inclined ramp portion and the downwardly sloped stop portion, the cam follower attached to the shaft with one of the pivotable retaining dogs and a portion of the pallet push bar.

As best seen in FIG. 6, the retaining dogs 39, only one of which is shown, are appropriately secured in place on the shaft 37, such as by locking collars 40. The retaining dogs 39 have a slip sheet engaging surface 41 which is roughened or serrated to prevent the slip sheet from riding up and over the top of the retaining dogs as the pallet 42 moves along the predetermined path of travel down the length of the palletizer 10.

On the opposing ends of shaft 37 are fastened cam followers, indicated generally by the numeral 44. Cam followers 44, only one of which is shown in FIG. 6, have a cam roller 45 that is rotatably mounted in a roller support bracket 46. The cam rollers 45 ride along the opposing tracks 18. As seen in FIG. 3, the opposing tracks 18 have track cover plates 19 overlying the cam followers 44, which also serve as pallet guides to keep the pallets oriented correctly as they pass through the palletizer 10.

Opposing tracks 18 have an inclined ramp 21 on each track, one of which is best seen in FIG. 6, which causes the cam follower to rotate in the direction shown by the arrow 48 in FIG. 6. Since the cam follower 44 is rigidly fastened to the rotatable shaft 37, this causes the shaft 37 to also rotate in the direction shown by arrow 48. Since the retaining dogs 39 are also rigidly fastened to the rotatable shaft, this rotation of the shaft 37 causes the retaining dogs 39 at the first location on the predetermined path of travel of the conveyor, where the inclined ramp 21 is located, to rotate to the raised position.

As the conveyor continues to move the pallet push bar 29 down the length of the palletizer 10 along its predetermined path of travel the cam followers 44 encounter a break 49 in the opposing track prior to engaging the downwardly sloped stop portion 22. This downwardly sloped stop portion 22 causes the cam followers to be pushed or rotated in a direction that is the reverse of that shown by the arrow 48, thereby causing the shaft 37 to rotate in the same direction. This reverse rotational movement causes the retaining dogs 39 to be pivoted or rotated downwardly at this second location to their original or first lowered position. The location of the second position where the downwardly sloped stop portion 22 is located is best seen in FIGS. 1 and 2 and corresponds to the area where the pallet has passed beneath a substantial portion of the stripper plate 20 and has a sufficient portion extending out thereunder to receive at least a part of the product load on top of the slip sheet 50.

In operation the automatic palletizer 10 feeds a pallet 42 from the pallet feed stack or magazine 11 onto the conveyor. The pallet push bar 29 engages the rear side of the pallet 42 with its front side 34 and pushes the pallet along the floor member 13 toward the slip sheet dispenser 12. As the bottommost pallet 42 is removed from the pallet feed stack or magazine 11, the next higher pallet is temporarily supported by the roller 32 on the pallet push bar 29. As the conveyor moves the pallet push bar 29 and the pallet 42 along the predetermined path of travel, the roller 32 rolls along the underside of the next higher pallet in the pallet feed stack 11 until the pallet push bar 29 is clear of the pallet feed stack 11. The next higher pallet then rests on the top of the floor member 13 and the drag on the pallet push bar 29 has been substantially reduced by the presence of the roller 32 to achieve rolling frictional contact instead of static dragging frictional contact which is present when there is only a flat or unmoveable contact suface on the top of the pallet push bar 29.

Upon determination by a sensing unit (not shown) that the pallet is in position beneath the slip sheet dispenser 12, a single slip sheet 50 is placed on top of the pallet. The cam rollers 45, prior to the pallet 42 leaving the slip sheet loading position beneath the slip sheet dispenser 12, ride up the inclined ramps 21 of the opposing track 18 when the conveyor recommences movement after placement of the slip sheet to thereby cause the rotatable shaft 37 to rotate in the direction shown by the arrow 48 of FIG. 6. This rotational movement causes the retaining dogs 39 to pivot or rotate at the first location along the predetermined path of travel of the conveyor to move from their first lowered position to their second raised position. In the second raised position the retaining dogs 39 engage the slip sheet 50 along the roughened slip sheet engaging surface 41. Once the slip sheet 50 is placed atop the pallet, a sensing mechanism, not shown, reactivates the movement of the conveyor and the pallet push bar 29 along the predetermined path of travel. The roughened slip sheet engaging surfaces 41 of the retaining dogs 39 prevent the slip sheet from riding up and over the top of the retaining dogs to thereby ensure that the slip sheet 50 remains in position on top of the pallet 42.

As the pallet 42 continues along the predetermined path of travel of the conveyor by being pushed by the pallet push bar 29, the second location along the predetermined path of travel is reached where the break 49 in the opposing tracks is encountered and the downwardly sloped stop portion 22 is positioned. The cam rollers 45 encounter the underside of the downwardly sloped stop portion 22, thereby causing the cam followers to be pushed or rotated in a direction that is reverse of that shown by the arrow 48 to cause the shaft 37 to rotate in the same reversed direction. This reversed rotational movement causes the retaining dogs 39 to be pivoted or rotated downwardly at the second location to their original or first lowered position. At this second location the pallet 42 has been positioned so that it extends out at least partially from beneath the stripper plate 20 with a sufficient portion extending out thereunder to receive at least a part of the product load on top of the slip sheet 50. Any further movement of the pallet along the predetermined path, because of the presence of the containers or product on top of the slip sheet 50, does not encounter the danger of having the slip sheet move out of position on the pallet.

While the preferred structure, in which the principles of the present invention have been incorporated, has been shown and described above, it is to be understood that the invention is not to be limited to the particular details thus presented, but in fact, widely different means may be employed in the practice of the broader aspects of this invention. For example, the retaining dogs 39 could be moved between their first lowered position and their second raised position by other than pivotable or rotational movement of the shaft 37. The retaining dogs 39 could be moveable in a generally vertical direction by the appropriate mechanism. Similarly, the triggering or actuation mechanism to move the retaining dogs 39 between their first lowered position and their second raised position could be any other suitable device besides the inclined ramp 21 and the downwardly sloped stop portion 22. The scope of the appended claims is intended to encompass all obvious changes in the details, materials and arrangements of parts which will occur to one of skill in the art upon the reading of the disclosure.

Having thus described the invention, what is claimed is:

1. In a palletizer for providing pallets with a bottom feed pallet system including a generally vertical stack of pallets having at least a bottommost and a next higher pallet wherein the underside of a bottommost pallet is placed on conveying means, the pallet being conveyed along a predetermined path of travel to a loading point for the placement of objects thereon, the palletizer having means to place a slip sheet having a front edge and a back edge on top of a pallet as the pallet is conveyed by conveying means along the predetermined path of travel, the improvement comprising in combination:
   (a) a pallet push bar connected to the conveying means, the pallet push bar having a front side, a rear side and a top portion therebetween, the top portion having a rotatable roller with a first end and an opposing second end, the roller being adjacent a portion of the rear side to support the underside of the next higher pallet the front side contacting a back edge of the pallet to convey the pallet along the predetermined path of travel; and
   (b) means for retaining the slip sheet in position on top of the pallet as the pallet is conveyed along the predetermined path to the loading point, the means for retaining being connected to the pallet push bar exteriorly of both the first end and the opposing second end of the roller and having at least a first serrated slip sheet engaging surface to engage the back edge of the slip sheet to prevent the slip sheet from riding up and over the retaining means as the pallet is conveyed along the predetermined path of travel.

2. The apparatus according to claim 1 wherein the conveying means further includes a pair of opposing side tracks along which the pallet push bar travels.

3. The apparatus according to claim 2 wherein the means for retaining the slip sheet are movable between a first lowered position and a second raised position, the means for retaining the slip sheet engaging the back edge of the slip sheet when in the second raised position.

4. The apparatus according to claim 3 wherein the means for retaining the slip sheet further includes at least two retaining dogs.

5. The apparatus according to claim 4 wherein each of the opposing side tracks at a first location along the predetermined path of travel have means for automatically actuating the retaining dogs to move from the first lowered position to the second raised position.

6. The apparatus according to claim 5 wherein each of the opposing side tracks at a second location along the predetermined path of travel have means for automatically deactuating the retaining dogs to move from the second raised position to the first lowered position.

7. The apparatus according to claim 6 wherein the means for automatically actuating further comprise an inclined ramp portion.

8. The apparatus according to claim 7 wherein the means for automatically deactuating further comprise a downwardly sloped stop portion.

9. The apparatus according to claim 8 wherein the retaining dogs are pivotable between the first lowered position and the second raised position.

10. The apparatus according to claim 9 wherein the retaining dogs are fastened to a pivotable shaft having opposing ends, each end further having a cam roller attached thereto so that when the pallet push bar is at the first location along the predetermined path of travel the cam rollers ride up the inclined ramp portion causing the shaft to pivot and the retaining dogs to move from the first lowered position to the second raised position and when the pallet push bar is at the second location along the predetermined path of travel the cam rollers engage the downwardly sloped stop portion causing the shaft to pivot and the retaining dogs to move from the second raised position to the first lowered position.

* * * * *